(12) United States Patent
Wilkinson et al.

(10) Patent No.: US 9,300,194 B2
(45) Date of Patent: Mar. 29, 2016

(54) ELECTROMAGNETIC DEVICE

(75) Inventors: Scott P. Wilkinson, German Valley, IL (US); Michael R. Hernden, Rockford, IL (US)

(73) Assignee: HAMILTON SUNDSTRAND CORPORATION, Windsor Locks, CO (US)

(*) Notice: Subject to any disclaimer, the term of this patent is extended or adjusted under 35 U.S.C. 154(b) by 1068 days.

(21) Appl. No.: 13/292,832

(22) Filed: Nov. 9, 2011

(65) Prior Publication Data
US 2013/0113222 A1 May 9, 2013

(51) Int. Cl.
*H02K 11/00* (2006.01)
*H02K 29/12* (2006.01)
*H02K 3/28* (2006.01)

(52) U.S. Cl.
CPC . *H02K 29/12* (2013.01); *H02K 3/28* (2013.01)

(58) Field of Classification Search
USPC .............. 310/179, 184, 156.01, 216.019, 310/216.022, 216.024, 216.026, 216.027, 310/216.028, 216.029, 216.033, 216.034, 310/216.036, 216.037
See application file for complete search history.

(56) References Cited

U.S. PATENT DOCUMENTS

| 4,937,508 | A |   | 6/1990 | Rozman |   |
|---|---|---|---|---|---|
| 4,949,021 | A |   | 8/1990 | Rozman et al. |   |
| 4,967,132 | A |   | 10/1990 | Rozman et al. |   |
| 5,124,604 | A | * | 6/1992 | Swartz | 310/68 B |
| 5,349,257 | A | * | 9/1994 | Hernden | 310/68 B |
| 5,363,032 | A |   | 11/1994 | Hanson et al. |   |
| 5,430,362 | A |   | 7/1995 | Carr et al. |   |
| 5,488,286 | A |   | 1/1996 | Rozman et al. |   |
| 5,495,162 | A |   | 2/1996 | Rozman et al. |   |
| 5,994,802 | A | * | 11/1999 | Shichijyo et al. | 310/51 |
| 6,104,113 | A |   | 8/2000 | Beifus |   |
| 6,522,130 | B1 |   | 2/2003 | Lutz |   |
| 6,750,575 | B2 |   | 6/2004 | Wright |   |
| 6,987,368 | B2 |   | 1/2006 | Yamasaki et al. |   |
| 7,242,175 | B2 |   | 7/2007 | Shao et al. |   |
| 7,579,799 | B2 |   | 8/2009 | Robichaux et al. |   |
| 8,193,679 | B2 | * | 6/2012 | Calley et al. | 310/208 |
| 2004/0145323 | A1 |   | 7/2004 | Maslov et al. |   |
| 2009/0147632 | A1 | * | 6/2009 | Fujita | 369/44.32 |
| 2010/0109453 | A1 | * | 5/2010 | Calley et al. | 310/46 |
| 2011/0140645 | A1 |   | 6/2011 | Meyer |   |
| 2011/0175561 | A1 | * | 7/2011 | Kakiuchi et al. | 318/400.37 |

FOREIGN PATENT DOCUMENTS

| EP | 1505719 B1 | 10/2011 |
|---|---|---|
| JP | 06189514 A | 7/1994 |
| JP | 2000060040 A | 2/2000 |
| JP | 2005051855 A | 2/2005 |
| JP | 2009213283 A | 9/2009 |
| JP | 2011062055 A | 3/2011 |

OTHER PUBLICATIONS

Janpanes Office Action issued in JP2012-194818 dated Jan. 23, 2014, 6 pages.

* cited by examiner

*Primary Examiner* — Naishadh Desai
(74) *Attorney, Agent, or Firm* — Cantor Colburn LLP

(57) ABSTRACT

An electromagnetic device is provided and includes a stator defining a bore, a rotor rotatable within the stator bore and having permanent magnetic elements disposed about an outer surface thereof to define a series of magnetic poles, power coils configured to generate a power current as a first portion of the magnetic poles pass each of the power coils due to rotor rotation and sense coils configured to generate a sense current as a second portion of the magnetic poles pass each of the sense coils due to the rotor rotation.

20 Claims, 5 Drawing Sheets

ELECTROMAGNETIC DEVICE

FEDERAL RESEARCH STATEMENT

This patent application relates to subject matter invented pursuant to US Army contract number 40096327 of Sep. 20, 2010. The government has certain rights to this invention.

BACKGROUND OF THE INVENTION

The subject matter disclosed herein relates to electromagnetic devices and machines and, more particularly, to an arrangement for determining the position of a generator or motor rotor.

In a power conversion system, such as a variable-speed, constant-frequency (VSCF) power generating system, a generator, typically a brushless, three-phase synchronous generator, is operated in a generating mode to convert variable-speed motive power supplied by a prime mover into variable-frequency alternating current (AC) power. The prime mover may be, for example, a gas turbine engine of an aircraft. In some cases, the variable-frequency AC power produced by the generator is transmitted to a rectifier where it is rectified and provided as a direct current (DC) signal over a DC link to an inverter. The inverter may then invert the DC signal on the DC link into constant-frequency AC power for supply over a load bus to one or more AC loads.

A generator can also be operated as a motor in a starting mode to convert electrical power supplied by an external AC power source into motive power which may in turn be provided to the prime mover to bring the prime mover up to self-sustaining speed. For example, when operated in a starting mode, the generator can be used to start a gas turbine engine of an aircraft.

One type of a brushless, synchronous generator, which can be operated in both a generating mode and a starting mode, includes a permanent magnet generator (PMG). In order to properly control such a generator, it is necessary to time the rectification in synchronicity with the position of the generator's rotor. Previously, such synchronization was achieved by using a position sensor such as a Hall Effect sensor. As the rotor of the PMG rotates, the voltage across each Hall Effect sensor varies from zero to a maximum as a function of rotor position such that the outputs from the Hall Effect sensors are representative of the position of the rotor. The output signals from the Hall Effect sensors are then used to control switching elements in the rectifier.

The use of such position sensors, however, entails considerable expense in the position sensor itself and its associated electronics, and further results in extra wires and extra assembly steps to install the position sensing apparatus. Also, operational parameters often limit the accuracy of such position sensors.

BRIEF DESCRIPTION OF THE INVENTION

According to one aspect of the invention, an electromagnetic device is provided and includes a stator defining a bore, a rotor rotatable within the stator bore and having permanent magnetic elements disposed about an outer surface thereof to define a series of magnetic poles, power coils configured to generate a power current as a first portion of the magnetic poles pass each of the power coils due to rotor rotation and sense coils configured to generate a sense current as a second portion of the magnetic poles pass each of the sense coils due to the rotor rotation.

According to another aspect of the invention, an electromagnetic device is provided and includes a stator defining a bore, a rotor rotatable within the stator bore and having permanent magnetic elements disposed about an outer surface thereof to define a series of magnetic poles, power coils supportively wound in the stator about a first section of the rotor and configured to generate a power current as a first portion of the magnetic poles pass each of the power coils due to rotor rotation and sense coils supportively wound in the stator about a second section of the rotor and configured to generate a sense current as a second portion of the magnetic poles pass each of the sense coils due to the rotor rotation.

According to yet another aspect of the invention, an electromagnetic device is provided and includes a stator defining a bore, a rotor rotatable within the stator bore and having permanent magnetic elements disposed about an outer surface thereof to define a series of twenty-eight magnetic poles, power coils supportively wound in the stator about a first section of the rotor and configured to generate a power current as at least twenty-five of the magnetic poles pass each of the power coils due to rotor rotation and sense coils magnetically and electrically decoupled from the power coils and supportively wound in the stator about a second section of the rotor, the sense coils being configured to generate a sense current as at least one of the remaining three of the magnetic poles pass each of the sense coils due to the rotor rotation.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
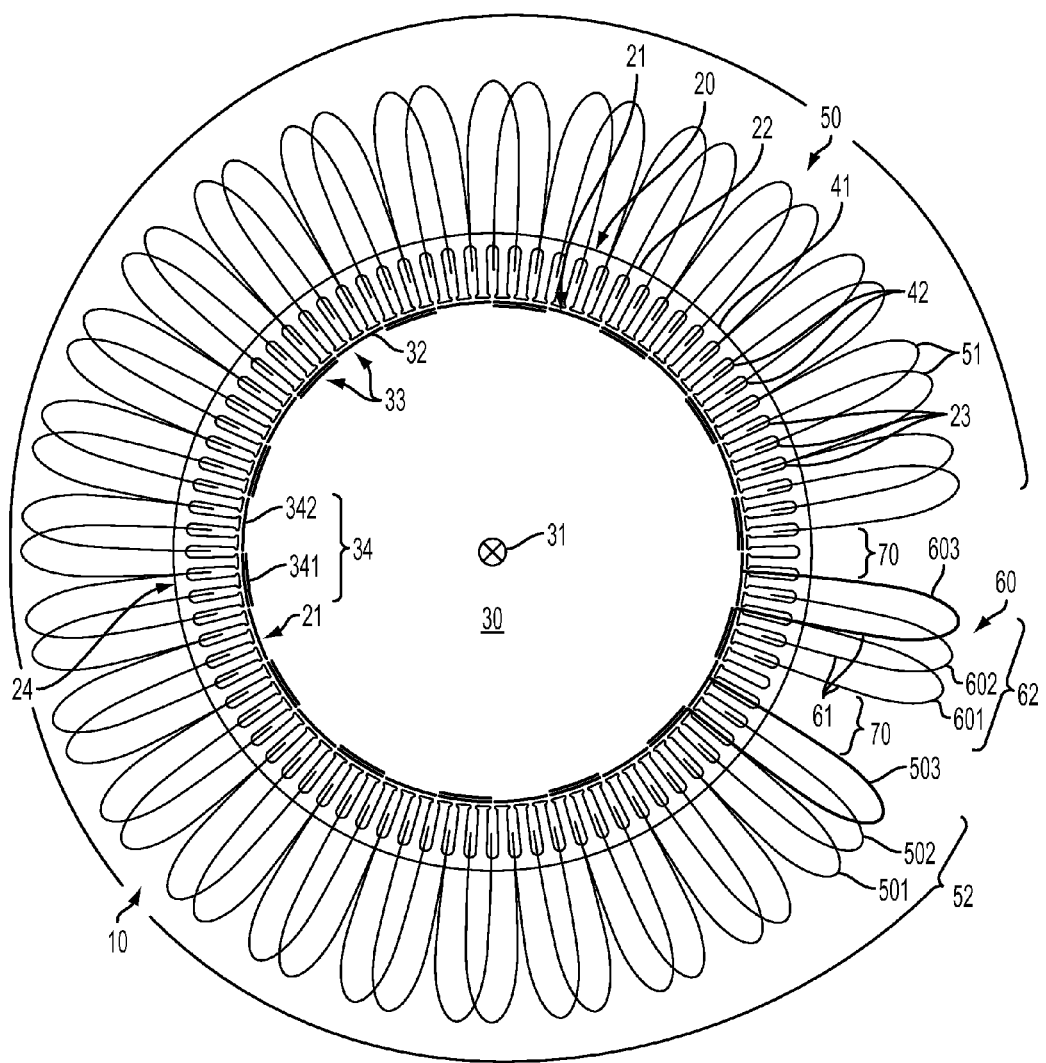
FIG. 1 is an axial view of an electromagnetic device in accordance with embodiments.
Figure 2:
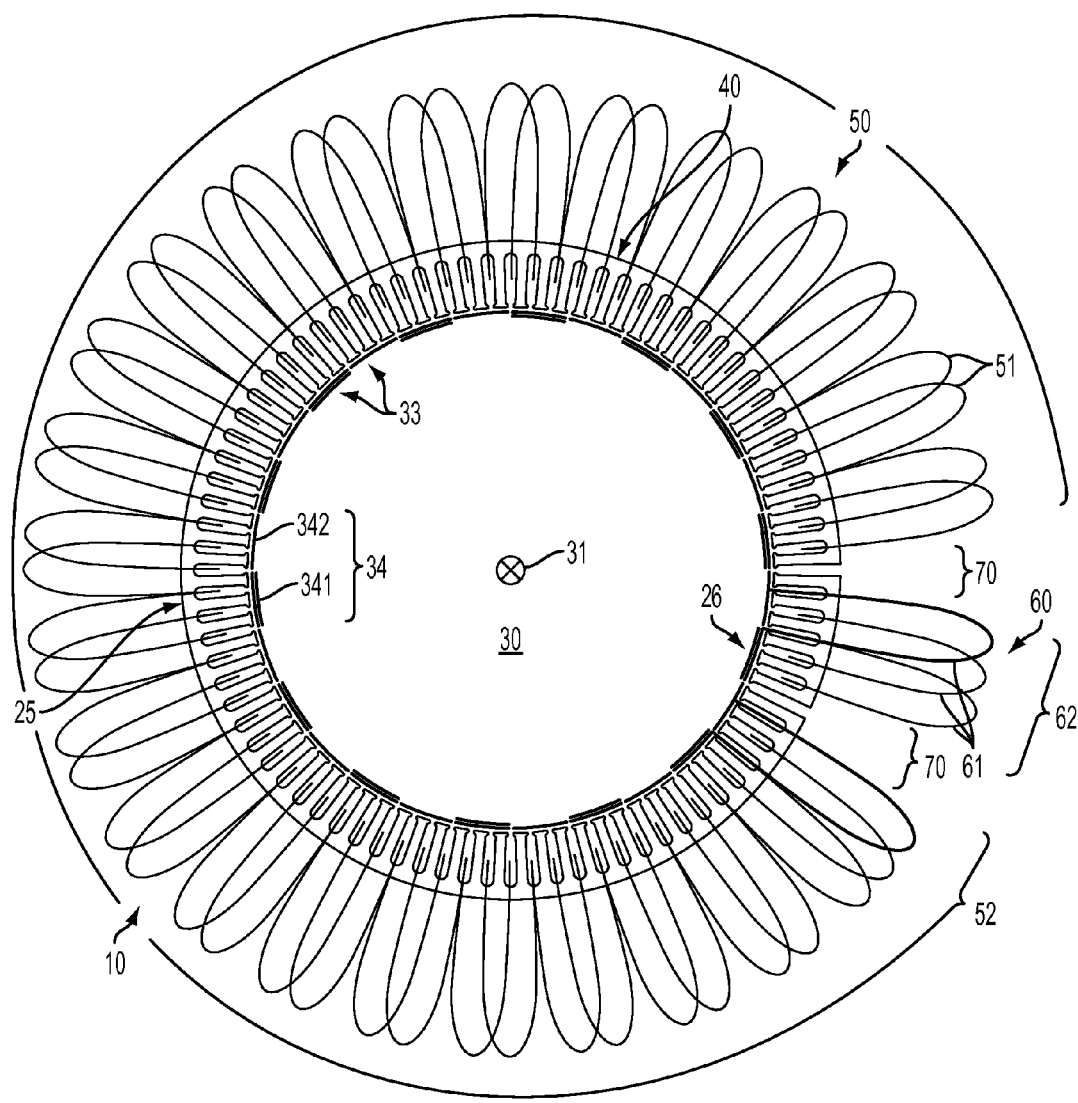
FIG. 2 is an axial view of an electromagnetic device in accordance with further embodiments.

With reference to FIGS. 1 and 2, an electromagnetic device 10 is provided. The electromagnetic device 10 includes a housing or stator 20, a rotor 30, power coils 50 and sense coils 60. The stator 20 defines a bore 21 in which the rotor 30 is rotatably disposed. The stator 20 has a body 22 that may be cast, molded, machined or formed of multiple laminations that are bonded together to define slots 23. The body 22 may be formed as a single piece 24, as shown in FIG. 1, or in multiple pieces 25 and 26, as shown in FIG. 2. In either case, the body 22 may have a substantially cylindrical internal shape with the bore 21 defined to extend longitudinally through the body 22. The rotor 30 is similarly substantially cylindrical and sized to fit within the bore 21 such that the rotor 30 is free to rotate about the longitudinal axis 31, which extends through a central longitudinal axis of the rotor 30.

The rotor 30 has a substantially cylindrical outer surface 32 that opposes a cylindrical inner facing surface of the bore 21. Permanent magnetic elements 33 are disposed on or near this outer surface 32 and about the rotor 30 at one or more axial positions. The permanent magnetic elements 33 are configured and arranged to define a series of magnetic poles 34 including north poles 341 and south poles 342, which are arranged in a repeating, alternating and substantially uniform series. In accordance with embodiments, twenty-eight magnetic poles 34 may be defined about the rotor 30.

The power coils 50 are supportively wound in the slots 23 of the body 22 of the stator 20 with, for example, a ⅔ pitch and a 3 phase "wye" connection. The power coils 50, of which there may be an A-phase power coil 501, a B-phase power coil 502 and a C-phase power coil 503, thus form a series of windings 51 (i.e., 3-phase windings) that together encompass a region defined about a first section 52 of the rotor 30. As the rotor 30 rotates within the bore 21, each of the magnetic poles 34 approaches and then recedes from each of the windings 51 of each of the power coils 50. The flux field generated by this rotation thereby induces an alternating current in each of the power coils 50. The power coils 50 are thus configured to generate a power current in a form of alternating current (AC) as a constantly changing first portion of the magnetic poles 34 pass each of the windings 51 of each of the power coils 50 due to the rotor rotation.

The stator 20 also includes the sense coils 60 that are magnetically and electrically separated and insulated from the power coils 50 and, like the power coils 50, are also supportively wound in the slots 23 of the body 22 of the stator 20 with, for example, a ⅔ pitch and a delta or 3 phase "wye" connection. The sense coils 60, of which there may be an A-phase sense coil 601, a B-phase sense coil 603 and a C-phase sense coil 602, thus form a series of windings 61 (i.e., 3-phase windings) that together encompass a region defined about a second section 62 of the rotor 30. As the rotor 30 rotates within the bore 21, each of the magnetic poles 34 approaches and then recedes from each of the windings 61 of each of the sense coils 50. The flux field generated by this rotation thereby induces an alternating current in each of the sense coils 60. The sense coils 60 are thus configured to generate a sense current in a form of alternating current (AC) as a constantly changing second portion of the magnetic poles 34 pass each of the windings 61 of each of the sense coils 50 due to the rotor rotation.

By referring to a current output of the sense coils 60, a current rotational position and/or speed of the one or more magnetic poles 34 inducing the sense current can be determined. Moreover, since the magnetic poles 34 are arranged in the repeating, alternating and uniform series, determining the current position of the one or more magnetic poles 34 inducing the sense current is effectively deterministic of the current position of each of the magnetic poles 34 about the rotor 30 and of the current rotational position and/or speed of the rotor 30. As such, the respective positions and movements of the magnetic poles 34 relative to the windings 51 of the power coils 50 can also be determined such that the AC output by the power coils 50 can be rectified with high precision and accuracy as will be described below. This ability to rectify the AC output by the power coils 50 provides for an efficient operation of the electromagnetic device 10 that supersedes any loss of power dictated by the replacement of a number of power coils 50 at the second section 62 of the rotor 30 with a corresponding number of the sense coils 60.

As shown in FIGS. 1 and 2, the first section 52 of the rotor 30 encompasses at least twenty-five of the twenty-eight magnetic poles 34. These twenty-five magnetic poles 34 are constantly changing during the rotation of the rotor 30. The second section 62 of the rotor 30 encompasses at least one of the remaining three of the twenty-eight magnetic poles 34, which are similarly constantly changing. In the case of the first section 52 encompassing twenty-eight magnetic poles 34 and the second section 62 encompassing one magnetic pole 34, the sense coils 60 may be separated from the power coils 50 by an air gap 70.

Figure 3:
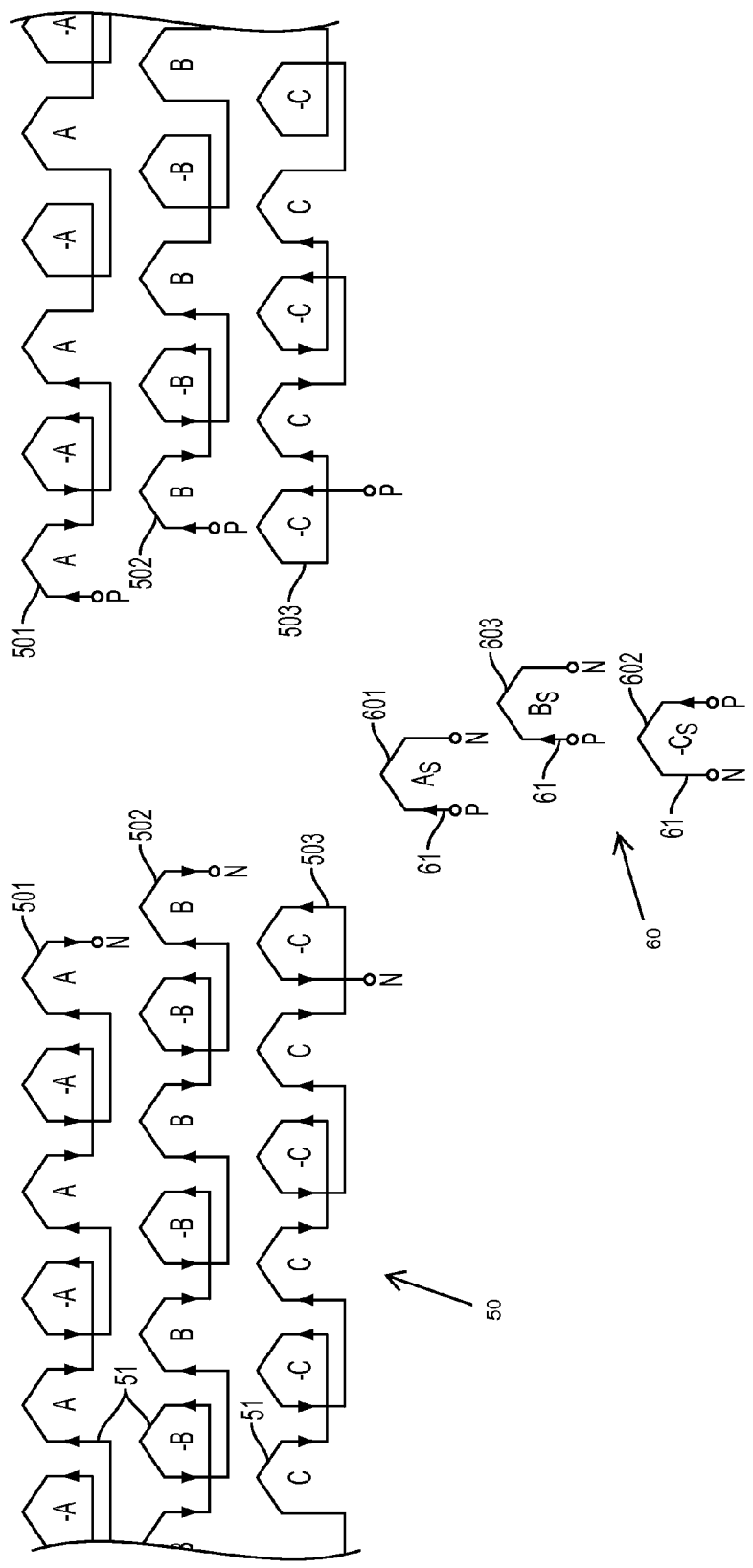
FIG. 3 is a schematic diagram illustrating an arrangement of power and sense coils of the electromagnetic device of FIGS. 1 and 2 in accordance with embodiments.

With reference to FIG. 3, an arrangement of power coils 50 and sense coils 60 of the electromagnetic device 10 is illustrated. As shown in FIG. 3, the A-phase power coil 501 forms a series of windings 51 that lags the windings 51 of the C-phase power coil 503 by 30°. Similarly, the windings 51 of the C-phase power coil 503 lags the windings 51 of the B-phase power coil by 30°. The sense coils 60 are disposed within the gap defined between electrical and polar opposite ends of the power coils 50 such that the sense coils 60 may be disposed in phase with the power coils 50 although this is not required as will be discussed below. For the sense coils, the A-phase sense coil 601 forms a winding 61 that trails the winding 61 of the C-phase sense coil 602 by 30°. Similarly, the winding 61 of the C-phase sense coil 602 trails the winding 61 of the B-phase sense coil 603 by 30°.

Figure 4:
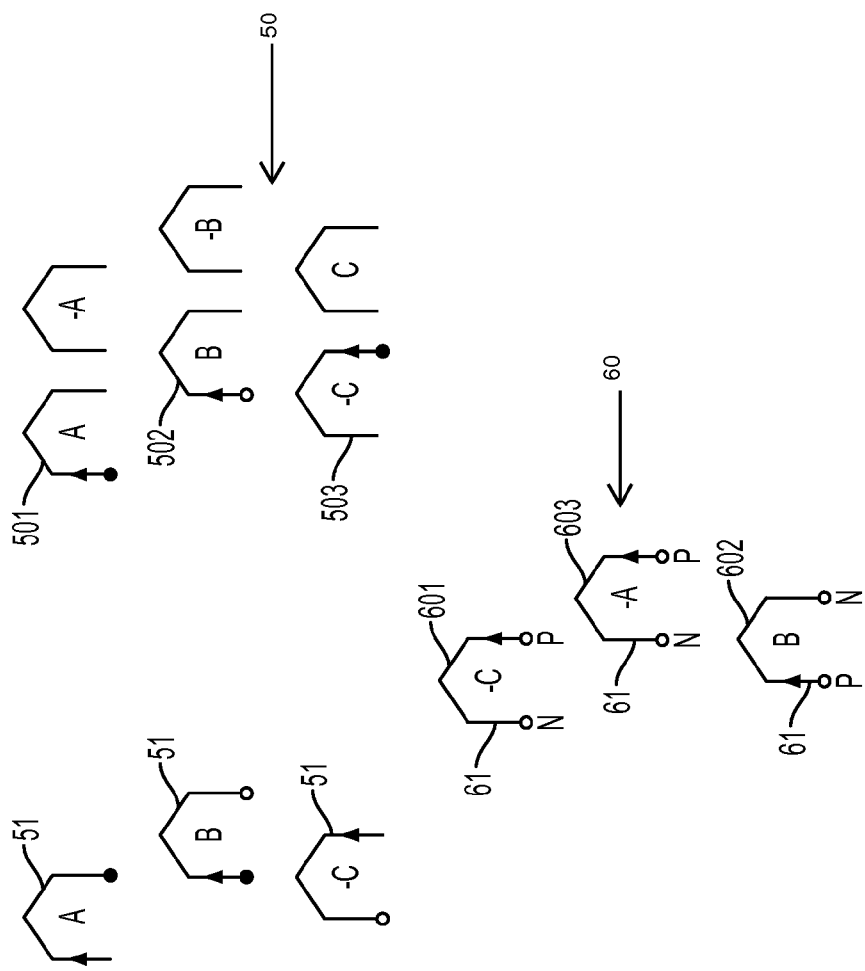
FIG. 4 is a schematic diagram illustrating an arrangement of power and sense coils of the electromagnetic device of FIGS. 1 and 2 in accordance with further embodiments.

With reference to FIG. 4, an alternative arrangement of the power coils 50 and the sense coils 60 of the electromagnetic device 10 is illustrated. As shown in FIG. 4, the sense coils 60 may be provided with a lead or lag phase shift relative to the phase of the power coils 50. In FIG. 4, this phase shift is illustrated as a 30° lead phase shift although it is to be understood that this is merely exemplary and that a lead or lag phase shift is possible in varying degrees. In the case of the lead phase shift, the processing unit 90 (see FIG. 5), which will be discussed below, may be provided with additional processing time to determine the rotational position and/or rotational speed of the rotor 30 and will be programmed to account for the additional time due to the phase shift.

Figure 5:
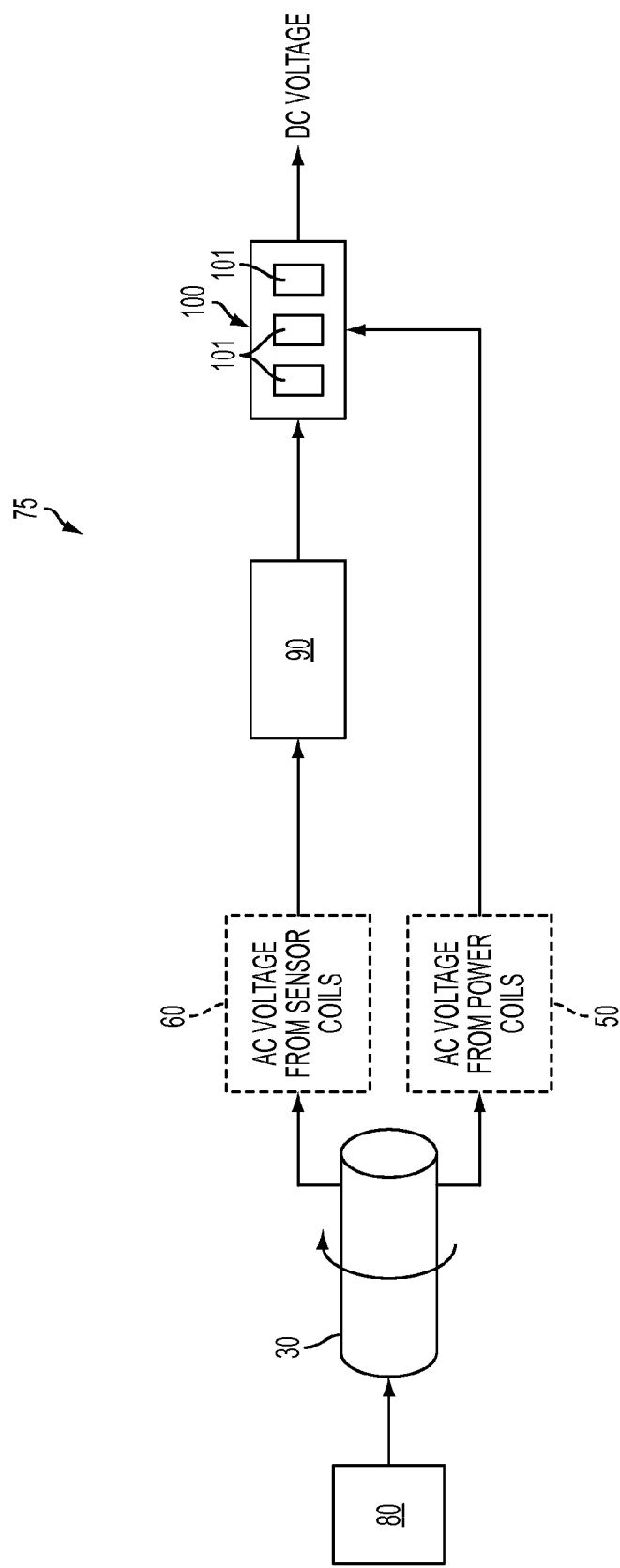
FIG. 5 is a schematic diagram of a system for producing direct current (DC) output.

With reference to FIG. 5, a system 75 for producing direct current (DC) output is provided. The system 75 includes the electromagnetic device 10 described above and further includes a driving element 80, a processing unit 90 and a rectifier 100. The driving element 80 provides motive power to drive the rotation of the rotor 30 and may be, for example, a gas turbine engine whose drive shaft is coupled to or integrally formed with the rotor 30. The processing unit 90 may include a digital signal processor and a memory/storage unit having executable instructions stored thereon. When executed, the executable instructions cause the digital signal processor to be receptive of the AC from the sense coils 60 and to determine the rotational position and/or speed of the rotor 30. It shall be understood, however, that the instructions could be implemented in hardware, firmware or a combination thereof.

The rectifier 100 is coupled to the processing unit 90 and configured to rectify the AC of the power coils 50 into an output of direct current (DC) voltage in accordance with the determined rotational position and/or speed of the rotor 30. To this end, the rectifier 100 is receptive of the AC from the power coils 50 and may include a series of transistors 101, respectively coupled to the A-phase power coil 501, the B-phase power coil 502 and the C-phase power coil 503. The transistors 101 operate by turning on and off at appropriate times based on the determined rotational position and/or speed of the rotor 30 to cooperatively produce the DC output from, for example, the peak values of the received AC current of the A-phase power coil 501, the B-phase power coil 502 and the C-phase power coil 503.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electromagnetic device, comprising:
   a stator defining a bore;
   a rotor rotatable within the stator bore and having permanent magnetic elements disposed about an outer surface thereof to define a series of magnetic poles;
   power coils configured to generate a power current as a first portion of the magnetic poles pass each of the power coils due to rotor rotation; and
   sense coils configured to generate a sense current as a second portion of the magnetic poles pass each of the sense coils due to the rotor rotation,
   the power and sense coils being disposed in a circumferentially displaced, non-overlapping and co-radial condition and separated at complementarily opposite respective ends thereof.

2. The electromagnetic device according to claim 1, wherein the sense coils are magnetically and electrically decoupled from the power coils.

3. The electromagnetic device according to claim 1, wherein the sense coils are separated from the power coils by an air gap.

4. The electromagnetic device according to claim 1, wherein the sense coils have a 30° phase shift relative to the power coils.

5. An electromagnetic device, comprising:
   a stator defining a bore;
   a rotor rotatable within the stator bore and having permanent magnetic elements disposed about an outer surface thereof to define a series of magnetic poles;
   power coils supportively wound in a first partially circumferential section of the stator about a first section of the rotor and configured to generate a power current as a first portion of the magnetic poles pass each of the power coils due to rotor rotation; and
   sense coils supportively wound in a second partially circumferential section of the stator about a second section of the rotor and configured to generate a sense current as a second portion of the magnetic poles pass each of the sense coils due to the rotor rotation,
   the first and second partially circumferential sections of the stator being disposed in a circumferentially displaced, non-overlapping and co-radial condition and separated at complementarily opposite respective ends thereof.

6. The electromagnetic device according to claim 5, wherein the stator comprises a stator core formed of multiple segments.

7. The electromagnetic device according to claim 5, wherein the sense coils are magnetically and electrically decoupled from the power coils.

8. The electromagnetic device according to claim 5, wherein the permanent magnetic elements are arranged in a repeating pattern of north and south poles about the outer surface of the rotor.

9. The electromagnetic device according to claim 5, wherein the permanent magnetic elements are disposed to define twenty-eight magnetic poles.

10. The electromagnetic device according to claim 9, wherein the first section of the rotor encompasses twenty-five consecutive magnetic poles of the twenty-eight magnetic poles and the second section of the rotor encompasses a middle one of the remaining three of the twenty-eight magnetic poles.

11. The electromagnetic device according to claim 5, wherein the power coils and the sense coils are disposed at a same radial position about the rotor and the sense coils are separated from the power coils by air gaps respectively circumferentially associated with separations of the first and second partially circumferential sections of the stator.

12. The electromagnetic device according to claim 5, wherein the power coils are arranged with a ⅔ pitch and a 3 phase "wye" connection.

13. The electromagnetic device according to claim 5, wherein the sense coils are arranged with a ⅔ pitch and a delta or 3 phase "wye" connection.

14. The electromagnetic device according to claim 5, wherein the sense coils have a 30° phase shift relative to the power coils.

15. The electromagnetic device according to claim 5, wherein the sense coils have a 30° lead phase shift relative to the power coils.

16. The electromagnetic device according to claim 5, wherein the sense coils have a 30° lag phase shift relative to the power coils.

17. A system for producing direct current (DC) output, the system comprising the electromagnetic device according to claim 1 and further comprising:
    a driving element to drive the rotation of the rotor;
    a processing unit, coupled to the sense coils to determine a rotational position of the rotor from the sense current; and
    a rectifier, coupled to the power coils and the processing unit, to rectify the power current in accordance with the determined rotational position.

18. The system according to claim 17, wherein the driving element comprises a gas turbine engine.

19. The system according to claim 17, wherein the rectifier comprises a series of transistors to cooperatively produce the DC output.

20. An electromagnetic device, comprising:
    a stator defining a bore;
    a rotor rotatable within the stator bore and having permanent magnetic elements disposed about an outer surface thereof to define a series of twenty-eight magnetic poles;
    power coils supportively wound in the stator about a first section of the rotor and configured to generate a power current as at least twenty-five of the magnetic poles pass each of the power coils due to rotor rotation; and
    sense coils magnetically and electrically decoupled from the power coils and supportively wound in the stator about a second section of the rotor, the sense coils being configured to generate a sense current as at least one of the remaining three of the magnetic poles pass each of the sense coils due to the rotor rotation,
    the first and second sections of the stator being disposed in a circumferentially displaced, non-overlapping and co-radial condition and separated at complementarily opposite respective ends thereof.

* * * * *